S. F. BROOKS.
COMBINED SLED AND TRUCK.
No. 185,014. Patented Dec. 5, 1876.
Fig: 1.
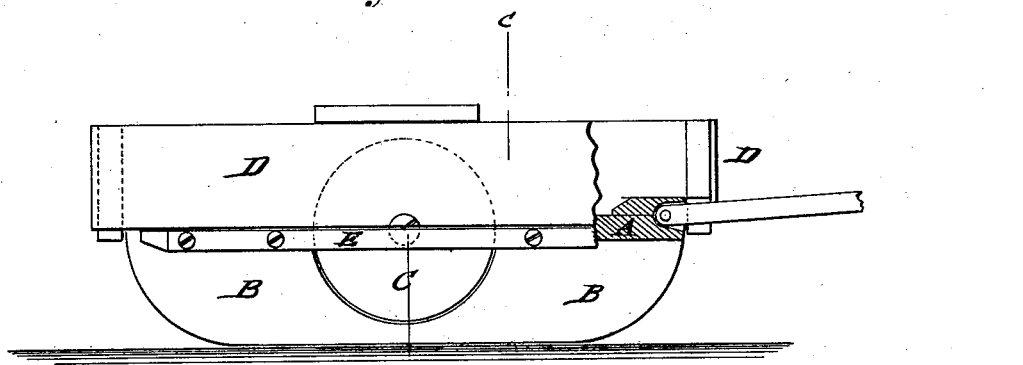
Fig: 2.
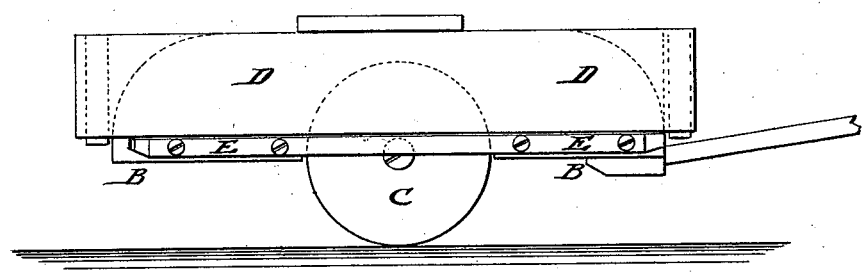
Fig: 3.
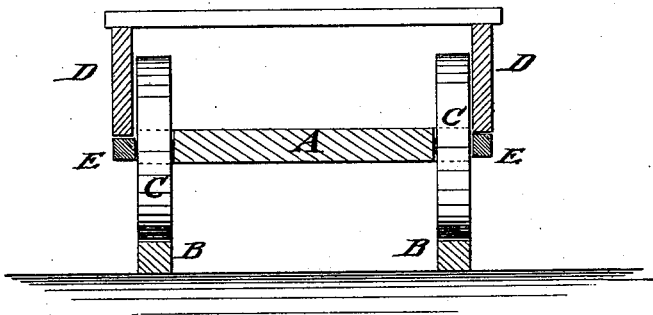
WITNESSES:
Chas Nida
J. H. Scarborough
INVENTOR:
S. F. Brooks.
BY
ATTORNEYS.

UNITED STATES PATENT OFFICE.

SYLVANUS F. BROOKS, OF CAMBRIDGEPORT, MASSACHUSETTS.

IMPROVEMENT IN COMBINED SLED AND TRUCK.

Specification forming part of Letters Patent No. 185,014, dated December 5, 1876; application filed October 23, 1876.

*To all whom it may concern:*

Be it known that I, SYLVANUS F. BROOKS, of Cambridgeport, in the county of Suffolk and State of Massachusetts, have invented a new and Improved Combined Sled and Truck, of which the following is a specification:

In the accompanying drawing, Figures 1 and 2 are side views of my improved sled and truck combined, showing the same respectively in position for use as sled or truck; and Fig. 3 is a vertical transverse section of the same on line *c c*, Fig. 1.

Similar letters of reference indicate corresponding parts.

The object of my invention is to provide an improved combination sled and truck of simple construction, that may be readily used for either purpose, being adapted with equal facility for carrying large loads by horse-power, and in smaller scale for the use of children.

The invention consists of a truck-body having runners, with semicircular recesses on one side, and wheels that extend into the recesses of the runners and above the body at the other side. Projecting side strips support a detachable frame on the body, whether the same is used on runners or wheels.

In the drawing, A represents the body of my combined sled and truck; B, the runners of the same, and C the wheels. The runners B are secured to the sides of body A, the wheels C being applied centrally to the same in such a manner that one half of them extends into semicircular concentric recesses of the runner, corresponding in shape to the wheels, and the other half of the wheels extends beyond the body at the side opposite to the runners, forming the support for the body, in the nature of a truck, when the wheels are placed on the ground, as shown in Fig. 2. The wheels are pivoted in suitable manner to the body.

When the body is placed into position with runners downward, it forms a sled, as shown in Fig. 1.

The body A, with runners and wheels, may be used, without any additional frame, as a drag for hauling wood, &c., a tongue or thills being applied at the front part.

For the purpose of using the sled or truck for other articles, a frame, D, is fitted around the body A, and supported on side strips E, attached to the runners below the edge of the body. The frame D has a recess to fit over the tongue, and a lateral top seat that stiffens the connection of the same.

When the vehicle is used as a sled, the frame D incloses the projecting wheel-sections—when used as a truck, the runners. The end boards of the frame extend downward to bear on the ends of the body and impart to the frame a steadier position thereon.

The combined sled and truck may also be used in smaller scale as a toy vehicle for the amusement of children, being quickly changed to a sled or truck, as desired.

Having thus described my invention, I claim as new and desire to secure by Letters Patent—

1. The combined sled and truck herein described, consisting, essentially, of the body A, runners B, having semicircular recesses, and the wheels C, journaled in the body, fitting partly in the recesses of the runners, and projecting above the body, substantially as and for the purpose set forth.

2. The combination of a body, A, having runners B, and wheels C, turning in semicircular recesses of the runners, with a detachable frame, D, extending around the body, and being supported on seats or side strips of the runners, substantially as set forth.

SYLVANUS F. BROOKS.

Witnesses:
C. F. MEAD,
FRANK C. CLOUSTON.